US008331883B2

(12) United States Patent
Sorensen

(10) Patent No.: US 8,331,883 B2
(45) Date of Patent: *Dec. 11, 2012

(54) ELECTRONIC DEVICES WITH CALIBRATED RADIO FREQUENCY COMMUNICATIONS CIRCUITRY

(75) Inventor: Robert Sorensen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 920 days.

This patent is subject to a terminal disclaimer.

(21) Appl. No.: 12/262,121

(22) Filed: Oct. 30, 2008

(65) Prior Publication Data

US 2010/0112967 A1    May 6, 2010

(51) Int. Cl.
*H01Q 11/12* (2006.01)
*H04B 1/04* (2006.01)
(52) U.S. Cl. ...................... 455/127.1; 455/522
(58) Field of Classification Search ............... 455/522, 455/572, 573, 127.1–127.5
See application file for complete search history.

(56) References Cited

U.S. PATENT DOCUMENTS

| | | |
|---|---|---|
| 3,613,011 A | 10/1971 | Wood |
| 4,709,404 A | 11/1987 | Tamura et al. |
| 5,055,797 A | 10/1991 | Chater |
| 5,182,527 A | 1/1993 | Nakanishi et al. |
| 5,410,276 A | 4/1995 | Hwang et al. |
| 6,008,698 A | 12/1999 | Dacus et al. |
| 6,163,706 A | 12/2000 | Rozenblit et al. |
| 6,178,313 B1 | 1/2001 | Mages et al. |
| 6,323,729 B1 | 11/2001 | Sevenhans et al. |
| 6,377,825 B1 | 4/2002 | Kennedy |
| 6,624,702 B1 | 9/2003 | Dening |
| 6,735,422 B1 | 5/2004 | Baldwin et al. |
| 6,819,910 B2 | 11/2004 | Shi et al. |
| 6,819,938 B2 | 11/2004 | Sahota |
| 7,110,469 B2 | 9/2006 | Shi et al. |
| 7,289,778 B2 | 10/2007 | Sasaki |
| 7,342,955 B2 | 3/2008 | Forest et al. |
| 7,398,106 B2 | 7/2008 | Conyers et al. |
| 7,558,539 B2 | 7/2009 | Huynh et al. |

(Continued)

FOREIGN PATENT DOCUMENTS

CN      1983851 A      6/2007

(Continued)

OTHER PUBLICATIONS

Sorensen, U.S. Appl. No. 12/330,497, filed Dec. 8, 2008.

(Continued)

*Primary Examiner* — Lincoln Donovan
*Assistant Examiner* — Diana J Cheng
(74) *Attorney, Agent, or Firm* — Treyz Law Group; G. Victor Treyz; Chih-Yun Wu

(57) ABSTRACT

Circuitry for portable electronic devices is provided. The circuitry may include wireless communications circuitry and storage and processing circuitry. The wireless communications circuitry may include an antenna and a radio-frequency power amplifier with an adjustable gain mode. The radio-frequency power amplifier may amplify radio-frequency signals to a given output power. The circuitry may include an adjustable power supply circuit that supplies an adjustable power supply voltage to the power amplifier circuitry. The circuitry may also include a transceiver that produce radio-frequency signals at a specified input power to the power amplifier circuitry. The storage and processing circuitry may be used in storing calibration data. The calibration data may specify adjustments to be made to the input power to the radio-frequency power amplifier, the gain mode setting of the power amplifier, and the power supply voltage for the power amplifier to optimize performance while minimizing power consumption.

18 Claims, 9 Drawing Sheets

U.S. PATENT DOCUMENTS

| | | |
|---|---|---|
| 7,639,072 B2 | 12/2009 | Sorrells et al. |
| 7,962,109 B1 | 6/2011 | Stockstad et al. |
| 7,970,427 B2 | 6/2011 | Agahi et al. |
| 7,978,621 B2 | 7/2011 | Rofougaran |
| 2002/0042256 A1 | 4/2002 | Baldwin et al. |
| 2002/0135343 A1 | 9/2002 | Underbrink et al. |
| 2004/0176145 A1 | 9/2004 | Lee et al. |
| 2004/0192408 A1 | 9/2004 | Sharp et al. |
| 2005/0136869 A1 | 6/2005 | Liu |
| 2005/0186923 A1 | 8/2005 | Chen |
| 2006/0046668 A1 | 3/2006 | Uratani |
| 2006/0068830 A1 | 3/2006 | Klomsdorf |
| 2006/0246859 A1 | 11/2006 | Rofougaran et al. |
| 2006/0252392 A1 | 11/2006 | Beamish et al. |
| 2007/0066250 A1 | 3/2007 | Takahashi et al. |
| 2007/0135071 A1 | 6/2007 | Lee et al. |
| 2007/0249304 A1 | 10/2007 | Snelgrove et al. |
| 2007/0291873 A1 | 12/2007 | Saito et al. |
| 2008/0002786 A1 | 1/2008 | Kerth et al. |
| 2008/0284510 A1 | 11/2008 | Drogi et al. |
| 2009/0068966 A1 | 3/2009 | Drogi et al. |

FOREIGN PATENT DOCUMENTS

| | | |
|---|---|---|
| EP | 1 237 297 | 9/2002 |
| EP | 1 986 331 | 10/2008 |
| JP | 2003 163607 | 6/2003 |
| KR | 20020030833 | 4/2002 |
| WO | 98/49771 | 11/1998 |
| WO | 01/22604 | 3/2001 |
| WO | 03/075452 | 9/2003 |
| WO | 2004/077664 | 9/2004 |
| WO | 2007/149346 | 12/2007 |

OTHER PUBLICATIONS

Dimpflmaier et al, U.S. Appl. No. 12/465,260, filed May 13, 2009.

Motorola, "Comparison of PAR and Cubic Metric for Power Derating", 3GPP Draft, R1-040642_EU9.5CUBICMETRIC, 3rd Generation Partnership Project (3GPP), Mobile Competence Centre, 650, Route Des Lucioles, F-06921 Sophia-Antipolis Cedex, France, vol. RAN WG4, no. Prague, Czech Republic, 20040812, Aug. 12, 2004, XP05017315.

"Understanding the Cubic Metric," [online]. Agilent Technologies, Inc. 2000-2009 [retrieved on Apr. 2, 2009] <URL: http://wireless.agilent.com/wireless/helpfiles/n7600b/cubic_metric.htm>.

Sorensen et al, U.S. Appl. No. 12/110,260, filed Apr. 25, 2008.

Takeya et al., U.S. Appl. No. 12/125,534, filed May 28, 2008.

"R&S CMU200 Universal Radio Communication Tester", Rohde & Schwarz, Nov. 2007.

ELECTRONIC DEVICES WITH CALIBRATED RADIO FREQUENCY COMMUNICATIONS CIRCUITRY

BACKGROUND

This invention relates generally to wireless communications circuitry, and more particularly, to wireless communications circuitry with power management capabilities.

Handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Due in part to their mobile nature, portable electronic devices are often provided with wireless communications capabilities. For example, handheld electronic devices may use long-range wireless communications to communicate with wireless base stations. Cellular telephones and other devices with cellular capabilities may communicate using cellular telephone bands at 850 MHz, 900 MHz, 1800 MHz, and 1900 MHz. Portable electronic devices may also use short-range wireless communications links. For example, portable electronic devices may communicate using the Wi-Fi® (IEEE 802.11) bands at 2.4 GHz and 5.0 GHz and the Bluetooth® band at 2.4 GHz. Communications are also possible in data service bands such as the 3G data communications band at 2170 MHz (commonly referred to as UMTS or Universal Mobile Telecommunications System band). The use of 3G communications schemes for supporting voice communications is also possible.

To satisfy consumer demand for small form factor wireless devices, manufacturers are continually striving to reduce the size of components that are used in these devices. For example, manufacturers have made attempts to miniaturize the batteries used in handheld electronic devices.

An electronic device with a small battery has limited battery capacity. Unless care is taken to consume power wisely, an electronic device with a small battery may exhibit unacceptably short battery life. Techniques for reducing power consumption may be particularly important in wireless devices that support cellular telephone communications, because users of cellular telephone devices often demand long talk times.

It is important that power reduction techniques for electronic devices be implemented in a way that allows desired performance criteria be satisfied. As an example, many wireless carriers specify minimum required values for adjacent channel leakage ratio (ACLR). High adjacent channel leakage ratio values are an indicator of poor radio-frequency transmitter performance and must generally be avoided to ensure satisfactory network operation. When minimizing power consumption, it would be advantageous to be able to take into account performance characteristics such as adjacent channel leakage ratio performance characteristics, so that improvements in power consumption performance do not inhibit satisfactory wireless performance.

It would therefore be desirable to be able to provide wireless communications circuitry for electronic devices with improved power management capabilities.

SUMMARY

A portable electronic device such as a handheld electronic device is provided with wireless communications circuitry. The wireless communications circuitry may include a radio-frequency transceiver, a power amplifier that amplifies radio-frequency signals from the transceiver, and an antenna through which the amplified radio-frequency signals may be wirelessly transmitted. The antenna and transceiver may also be used in receiving radio-frequency signals.

The portable electronic device may have an adjustable power supply. The power supply may provide a power supply voltage to the power amplifier that helps the portable electronic device satisfy performance constraints such as minimum output power requirements and required levels of adjacent channel leakage ratio. Adjustments may be made to the power supply voltage depending on required output power levels and operating frequency. Adjustments may also be made to the transceiver based on the operating frequency.

Storage and processing circuitry in the portable electronic device may be used to store calibration data. The calibration data may be produced during global and individualized calibration tests on the radio-frequency circuitry of the portable electronic device. During operation, calibration data may be used by the storage and processing circuitry to produce control signals for the transceiver, power amplifier, and power supply circuitry that help the electronic device satisfy performance constraints while minimizing power consumption through selective power amplifier power supply voltage and gain reductions.

Further features of the invention, its nature and various advantages will be more apparent from the accompanying drawings and the following detailed description of the preferred embodiments.

DETAILED DESCRIPTION

The present invention relates generally to wireless communications, and more particularly, to managing power consumption by wireless communications circuitry in wireless electronic devices while satisfying desired performance criteria.

The wireless electronic devices may be portable electronic devices such as laptop computers or small portable computers of the type that are sometimes referred to as ultraportables. The wireless electronic devices may also be somewhat smaller devices. Examples of smaller wireless electronic devices include wrist-watch devices, pendant devices, headphone and earpiece devices, and other wearable and miniature devices. With one suitable arrangement, the wireless electronic devices may be portable electronic devices such as handheld electronic devices.

The wireless devices may media players with wireless communications capabilities, handheld computers (also sometimes called personal digital assistants), remote controllers, global positioning system (GPS) devices, handheld gaming devices, or cellular telephones. The wireless electronic devices may also be hybrid devices that combine the functionality of multiple conventional devices. An example of a hybrid device is a cellular telephone that includes media player functionality, communications functions, web browsing capabilities, and support for a variety of other business and entertainment applications such as the iPhone® cellular telephones available from Apple Inc. of Cupertino, Calif. These are merely illustrative examples.

Figure 1:
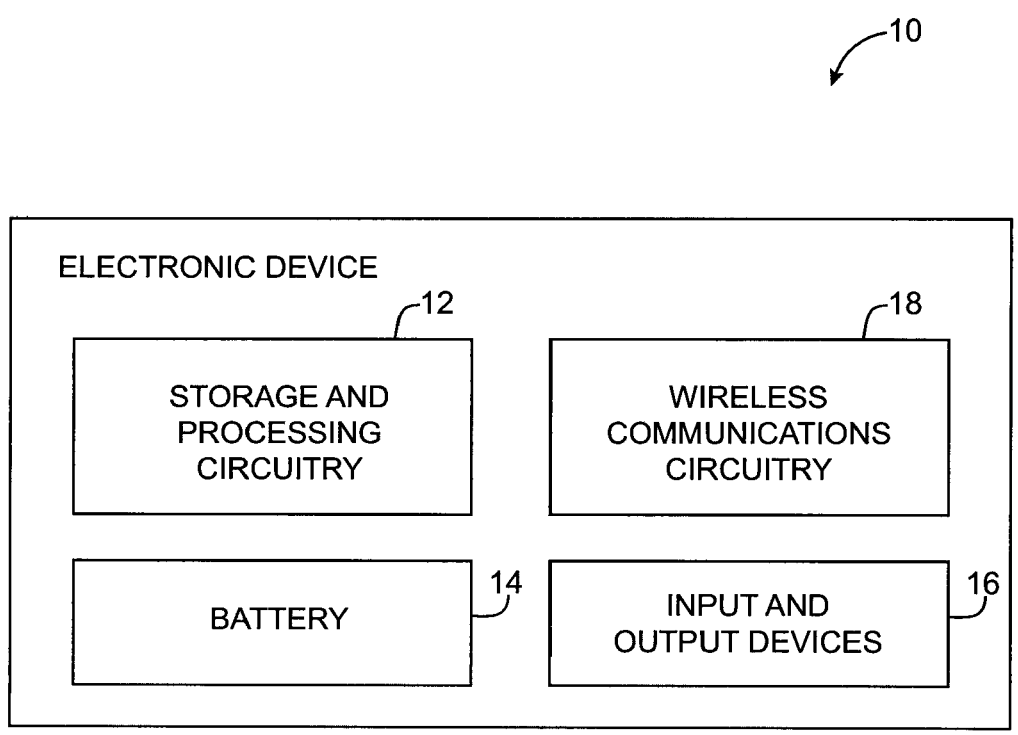
FIG. 1 is a diagram of an illustrative electronic device with wireless communications circuitry having power management capabilities in accordance with an embodiment of the present invention.

A schematic diagram of an embodiment of an illustrative wireless electronic device such as a handheld electronic device is shown in FIG. 1. Electronic device 10 of FIG. 1 may be a mobile telephone such as a cellular telephone with media player capabilities, a handheld computer, a remote control, a game player, a global positioning system (GPS) device, a laptop computer, a tablet computer, an ultraportable computer, a combination of such devices, or any other suitable electronic device.

As shown in FIG. 1, device 10 may include storage and processing circuitry 12. Storage and processing circuitry 12 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 12 may be used in controlling the operation of device 10. Processing circuitry in circuitry 12 may be based on processors such as microprocessors, microcontrollers, digital signal processors, dedicated processing circuits, power management circuits, audio and video chips, and other suitable integrated circuits.

With one suitable arrangement, storage and processing circuitry 12 may be used to run software on device 10, such as internet browsing applications, voice-over-internet-protocol (VOIP) telephone call applications, email applications, media playback applications, operating system functions, etc.

Storage and processing circuitry 12 may be used in implementing suitable communications protocols. Communications protocols that may be implemented using storage and processing circuitry 12 include internet protocols, wireless local area network protocols (e.g., IEEE 802.11 protocols—sometimes referred to as Wi-Fi®), protocols for other short-range wireless communications links such as the Bluetooth® protocol, protocols for handling 2G and 3G cellular telephone communications services, etc.

Device 10 may have one or more batteries such as battery 14. To minimize power consumption and thereby extend the life of battery 14, storage and processing circuitry 12 may be used in implementing power management functions for device 10. For example, storage and processing circuitry 12 may be used to adjust the gain of radio-frequency power amplifier circuitry on device 10 and may be used in adjusting input power levels provided to the input of radio-frequency power amplifier circuitry on device 10 from a transceiver circuit. Storage and processing circuitry 12 may also be used to adjust the power supply voltages that are used in powering the radio-frequency power amplifier circuitry. These adjustments may be made automatically in real time based on calibration data and operating algorithms (software). For example, code may be stored in storage and processing circuitry 12 that configures storage and processing circuitry 36 to implement a control scheme in which operating settings are adjusted to satisfy desired performance criteria such as desired transmit powers and adjacent channel leakage ratio values while minimizing power consumption.

Input-output devices 16 may be used to allow data to be supplied to device 10 and to allow data to be provided from device 10 to external devices. Examples of input-output devices 16 that may be used in device 10 include display screens such as touch screens (e.g., liquid crystal displays or organic light-emitting diode displays), buttons, joysticks, click wheels, scrolling wheels, touch pads, key pads, keyboards, microphones, speakers and other devices for creating sound, cameras, sensors, etc. A user can control the operation of device 10 by supplying commands through devices 16. Devices 16 may also be used to convey visual or sonic information to the user of device 10. Devices 16 may include connectors for forming data ports (e.g., for attaching external equipment such as computers, accessories, etc.).

Wireless communications devices 18 may include communications circuitry such as radio-frequency (RF) transceiver circuitry formed from one or more integrated circuits, power amplifier circuitry (e.g., power amplifier circuitry that is controlled by control signals from storage and processing circuitry 14 to minimize power consumption while satisfying desired performance criteria), passive RF components, antennas, and other circuitry for handling RF wireless signals. Wireless signals can also be sent using light (e.g., using infrared communications).

Device 10 can communicate with external devices such as accessories, computing equipment, and wireless networks over wired and wireless communications paths.

For example, accessories such as wired or wireless headsets may communicate with device 10. Device 10 may also be connected to audio-video equipment (e.g., wireless speakers, a game controller, or other equipment that receives and plays audio and video content), or a peripheral such as a wireless printer or camera.

Device 10 may use a wired or wireless path to communicate with a personal computer or other computing equipment. The computing equipment may be, for example, a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Device 10 can also communicate with wireless network equipment, such as cellular telephone base stations, cellular towers, wireless data networks, computers associated with wireless networks, etc. Such wireless networks may include network management equipment that monitors the wireless signal strength of the wireless handsets such as device 10 that are in communication with the network. To improve the overall performance of the network and to ensure that interference between handsets is minimized, the network management equipment may send power adjustment commands (sometimes referred to as transmit power control commands) to each handset. The transmit power control settings that are provided to the handsets direct handsets with weak signals to increase their transmit powers, so that their signals will be properly received by the network. At the same time, the transmit power control settings may instruct handsets whose signals are being received clearly at high power to reduce their transmit power control settings. This reduces interference between handsets and allows the network to maximize its use of available wireless bandwidth.

When devices such as device 10 receive transmit power control settings from the network or at other suitable times, each device 10 may make suitable transmission power adjustments. For example, a device may adjust the power level of signals transmitted from transceiver circuitry to radio-frequency power amplifiers on the device and may adjust the radio-frequency power amplifiers. Adjustments such as these may include gain mode settings adjustments and power supply voltage adjustments.

The output signals from the power amplifiers on devices 10 are wirelessly transmitted from device 10 to suitable receivers using antennas on devices 10. The settings for wireless communications circuitry 18 may include gain mode adjustments that control the gain settings of power amplifiers. For example, a gain mode adjustment may control whether a power amplifier is operating in a high gain mode in which all power amplifier stages that are available are being used or a low gain mode in which one or more of the gain stages on the power amplifier have been shut down to conserve power. Power supply voltage adjustments may be used to help minimize power consumption at a given gain setting. In typical circuit architectures, a transceiver circuit may supply radio-frequency signals to the input of a power amplifier for transmission through an antenna. The power at which the transceiver circuit outputs these radio-frequency signals establishes an input power level (sometimes referred to herein as Pin) for the power amplifier. Input power adjustments (adjustments to Pin) can be made to adjust the power of radio-frequency signals transmitted by device 10.

The antenna structures and wireless communications devices of device 10 may support communications over any suitable wireless communications bands. For example, wireless communications devices 18 may be used to cover communications frequency bands such as cellular telephone voice and data bands at 850 MHz, 900 MHz, 1800 MHz, 1900 MHz, and the communications band data at 2170 MHz band (commonly referred to as a UMTS or Universal Mobile Telecommunications System band), the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1550 MHz.

Device 10 can cover these communications bands and other suitable communications bands with proper configuration of the antenna structures in wireless communications circuitry 18. Any suitable antenna structures may be used in device 10. For example, device 10 may have one antenna or may have multiple antennas. The antennas in device 10 may each be used to cover a single communications band or each antenna may cover multiple communications bands. If desired, one or more antennas may cover a single band while one or more additional antennas are each used to cover multiple bands.

Figure 2:
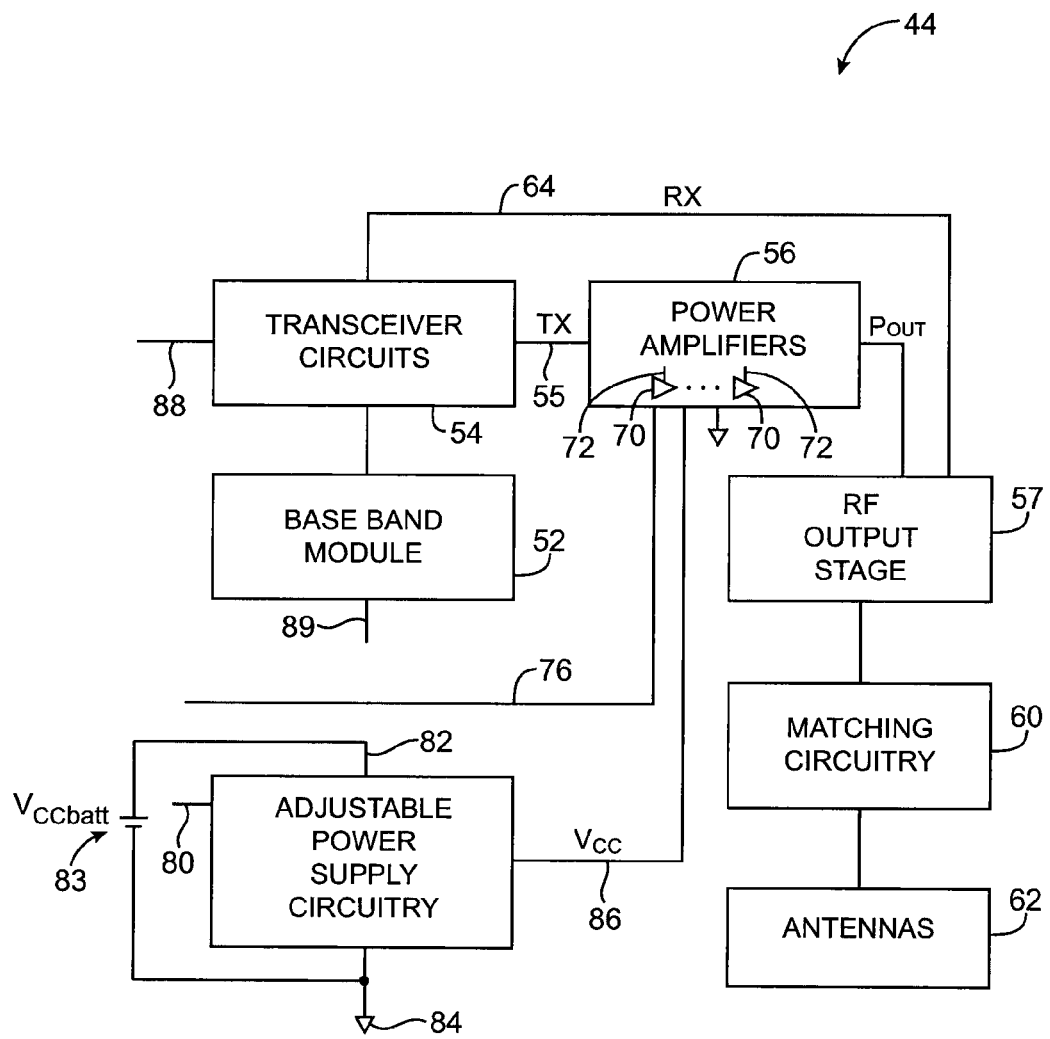
FIG. 2 is a circuit diagram of illustrative wireless communications circuitry that may be used in an electronic device with wireless communications circuitry power management capabilities in accordance with an embodiment of the present invention.

Illustrative wireless communications circuitry that may be used in circuitry 18 of FIG. 1 in device 10 is shown in FIG. 2. As shown in FIG. 2, wireless communications circuitry 44 may include one or more antennas such as antennas 62. Data signals that are to be transmitted by device 10 may be provided to baseband module 52 (e.g., from storage and processing circuitry 12 of FIG. 1). Baseband module 52 may be implemented using a single integrated circuit (e.g., a baseband processor integrated circuit) or using multiple circuits. Baseband processor 52 may receive signals to be transmitted over antenna 62 at input line 89 (e.g., from storage and processing circuitry 12). Baseband processor 52 may provide signals that are to be transmitted to transmitter circuitry within RF transceiver circuitry 54. The transmitter circuitry may be coupled to power amplifier circuitry 56 via path 55. Control path 88 may receive control signals from storage and processing circuitry 12 (FIG. 1). These control signals may be used to control the power of the radio-frequency signals that the transmitter circuitry within transceiver circuitry 54 supplies to the input of power amplifiers 56 via path 55. This transmitted radio-frequency signal power level is sometimes referred to herein as Pin, because it represents the input power to power amplifier circuitry 56.

During data transmission, power amplifier circuitry 56 may boost the output power of transmitted signals to a sufficiently high level to ensure adequate signal transmission. Radio-frequency (RF) output stage circuitry 57 may contain radio-frequency switches and passive elements such as duplexers and diplexers. The switches in RF output stage circuitry 57 may, if desired, be used to switch circuitry 44 between a transmitting mode and a receiving mode. Duplexer and diplexer circuits and other passive components in RF output stage may be used to route input and output signals based on their frequency.

Matching circuitry 60 may include a network of passive components such as resistors, inductors, and capacitors and ensures that antenna structures 62 are impedance matched to the rest of the circuitry 44. Wireless signals that are received by antenna structures 62 may be passed to receiver circuitry in transceiver circuitry 54 over a path such as path 64.

Each power amplifier (e.g., each power amplifier in power amplifiers 56) may include one or more power amplifier stages such as stages 70. As an example, each power amplifier may be used to handle a separate communications band and each such power amplifier may have three series-connected power amplifier stages 70. Stages 70 may have control inputs such as inputs 72 that receive control signals. The control signals may be provided using a control signal path such as path 76. In a typical scenario, storage and processing circuitry 12 (FIG. 1) may provide control signals to stages 70 using a path such as path 76 and paths such as paths 72. The control signals from storage and processing circuitry 12 may be used to selectively enable and disable stages 70.

By enabling and disabling stages 70 selectively, the power amplifier may be placed into different gain modes. For example, the power amplifier may be placed into a high gain mode by enabling all three of power amplifier stages 70 or may be placed into a low gain mode by enabling two of the power amplifier stages. Other configurations may be used if desired. For example, a very low gain mode may be supported by turning on only one of three gain stages or arrangements with more than three gain mode settings may be provided by selectively enabling other combinations of gain stages (e.g., in power amplifiers with three or more than three gains stages).

Adjustable power supply circuitry such as adjustable power supply circuitry 78 may be powered by voltage source 83. Voltage source 83 may be, for example, a battery such as battery 14 of FIG. 1. Source 83 may supply a positive battery voltage to adjustable power supply circuitry 78 at positive power supply terminal 82 and may supply a ground voltage to adjustable power supply circuitry 78 at ground power supply terminal 84. Source 83 may be implemented using a lithium ion battery, a lithium polymer battery, or a battery 14 of any other suitable type.

Initially, the voltage supplied by battery source 83 may be high. As the battery becomes depleted, the voltage supplied by the battery will tend to drop. By using adjustable power supply circuitry 78, the amount of voltage Vcc that is supplied to power amplifier circuitry 56 over power supply voltage path 86 may be maintained at a desired value. For example, power supply circuitry 78 may, under appropriate conditions, receive a raw battery voltage from source 83 that drops with time and may produce a relatively constant output power Vcc on output path 86. This may help to avoid wasteful situations in which the circuitry of power amplifiers 56 is supplied with excessive voltages while the battery of source 83 is fresh. Such excessive voltages may lead to wasteful power consumption by circuitry 56.

Adjustable power supply circuitry 78 may be controlled by control signals received over a path such as path 80. The control signals may be provided to adjustable power supply circuitry 78 from storage and processing circuitry 12 (FIG. 1) or any other suitable control circuitry. The control signals on path 80 may be used to adjust the magnitude of the positive power supply voltage Vcc that is provided to power amplifier circuitry 56 over path 86. These power supply voltage adjustments may be made at the same time as gain mode adjustments are being made to the power amplifier circuitry 56 and at the same time that adjustments are being made to the power (Pin) on path 55. By making power supply voltage adjustments, gain level adjustments to power amplifier circuitry 56, and adjustments to the input power Pin at the input of power amplifier circuitry 56, power consumption by power amplifier circuitry 56 can be minimized and battery life may be extended under a variety of operating conditions.

Consider, as an example, a situation in which device 10 has received a transmit power command from a wireless base station that specifies a desired level of radio-frequency power to be transmitted by device 10. Storage and processing circuitry 12 can determine appropriate settings for wireless circuitry 44 that ensure that the desired power is transmitted through antenna 62, while minimizing power consumption. If, for example, the desired amount of transmitted power is relatively low, power may be conserved by turning off one or more of stages 70 in power amplifier circuitry 56. Power can also be conserved by reducing the power supply voltage Vcc that is supplied on path 86 when the maximum power supply voltage level is not required. Adjustments to Pin on path 55 may be made to ensure that performance requirements are met.

Adjustments such as these may be made by supplying control signals from storage and processing circuitry 12 to transceiver circuits 54 via path 88, power amplifiers 56 via path 76, and to adjustable power supply circuitry 78 via path 80. In particular, control signals may be provided from storage and processing circuitry 12 to power amplifier circuitry 56 on path 76 that adjust the gain level of the power amplifier (e.g., by turning on and off certain gain stages 70 in power amplifier circuitry 56). Additional adjustments to the performance of the power amplifier circuitry 56 may be made by using path 86 to supply a desired adjustable power supply voltage Vcc to power amplifier circuitry 56 from adjustable power supply circuitry 78 in accordance with control signals supplied on path 80. For example, if it is not necessary to operate the active amplifier stages in amplifier circuitry 56 at maximum gain, power can be conserved by lowering the power supply voltage Vcc to the active gain stages. At the same time, the magnitude of Pin on path 55 can be controlled.

During adjustments to transceiver circuitry 54, power amplifier circuitry 56, and power supply circuitry 78, storage and processing circuitry 13 can take steps to satisfy desired operating constraints on power amplifier circuitry 56 such as minimum desired output power settings and minimum values of adjacent channel leakage ratio (the ratio of transmitted power to adjacent channel power).

Wireless communications circuitry 44 of FIG. 2 may include circuitry for supporting any suitable types of wireless communications. For example, circuitry 44 may include circuits for supporting traditional cellular telephone and data communications (sometimes referred to as "2G" communications). An example of 2G cellular telephone systems are those based on the Global System for Mobile Communication (GSM) systems. Circuitry 44 may also include circuits for supporting newer communications formats (sometimes referred to as "3G" communications). These newer formats may support increased communications speeds and may be used for both data and voice traffic. Such formats may use wide band code-division multiple access (CDMA) technology.

Adjustable power supply circuitry 78 may be implemented using a DC/DC converter or any other suitable power conversion circuit. Circuitry 78 may receive a relatively higher voltage Vccbatt from battery 83 over power supply path 82 and may produce a corresponding regulated power supply voltage Vcc at a relatively lower voltage Vcc at output path 86. In a typical arrangement, the battery voltage Vccbatt may range from about 4.3 volts to about 3.4 volts and output voltage Vcc may range from about 3.4 volts to 3.1 volts. The voltage Vcc may be adjusted based on control signals received over path 80. Voltage Vcc may be adjusted continuously (e.g., to provide any desired output voltage in the range of 3.1 to 3.4 volts or other suitable range) or may be set to one of two or more discrete levels (e.g., 3.1 volts, 3.4 volts, etc.).

Power amplifier circuitry 56 may include multiple power amplifiers each of which handles a different communications band (e.g., bands at communications frequencies such as 850 MHz, 900 MHz, 1800 MHz, and 1900 MHz). If desired, some or all of power amplifiers in circuitry 56 may handle multiple communications bands (e.g., adjacent bands).

Power amplifier circuitry 56 may receive control signals over path 76. The control signals may be used to selectively turn on and off particular blocks of circuitry within each power amplifier. This type of adjustment may be used to place each power amplifier 56 in a desired gain mode. In a bimodal arrangement, each power amplifier may be placed in either a high gain mode or a low gain mode. If desired, other types of multimode arrangements may be supported (e.g., arrangements in which power amplifiers 56 can be adjusted to operate at three or more different gain settings.)

Components such as power amplifiers 56 do not always need to run at the maximum available battery voltage Vccbatt. Operating such components at battery voltages such as these can therefore waste power. To minimize the amount of wasted power, DC/DC converter circuitry 78 may be used to convert the unregulated and fluctuating voltage Vccbatt from its sometimes relatively high voltage levels to a more moderate power supply voltage level Vcc. The value of Vcc might be, for example, 3.1 volts or 3.4 volts (as an example). Because Vcc is significantly less than the maximum value of Vccbatt, power amplifiers 56 will not be overpowered and may therefore be powered efficiently.

If desired, the magnitude of power supply voltage Vcc may be adjusted in real time by storage and processing circuitry 12 to help minimize power consumption. A graph showing how an adjustable power supply circuit such as an adjustable dc-to-dc converter with a continuously variable output voltage Vcc may provide a radio-frequency power amplifier with suitable power supply voltages Vcc at various different power amplifier gain settings according to required values of transmitted radio-frequency power Pout is shown in FIG. 3.

Figure 3:
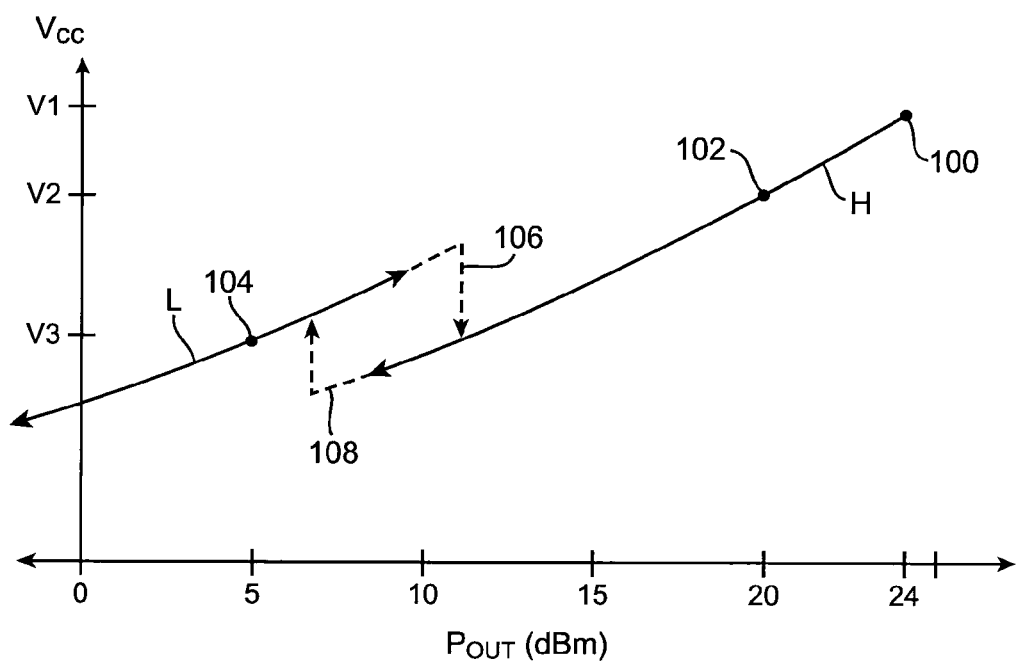
FIG. 3 is a graph showing how an adjustable power supply circuit may provide a radio-frequency power amplifier with different power supply voltages and how different power amplifier gain settings may be used when supplying various amounts of radio-frequency output power in accordance with an embodiment of the present invention.

As shown in FIG. 3, a power amplifier such as one of power amplifiers 56 may be characterized by two gain settings (as an example). In the FIG. 3 example, various gain stages in power amplifier 56 may be selectively enabled so that power amplifier may be set to operate in one of two gain modes. In high gain mode, the power amplifier may be characterized by line "H." In low gain mode, the power amplifier may be characterized by line "L."

The curve of FIG. 3 shows how the power supply voltage Vcc for the power amplifier may be reduced to minimize power consumption. The amount of power that may be saved depends, in general, on the amount of output power that is required at the output of power amplifier 56. When required (e.g., in accordance with a wireless network TPC instruction or other requirement), the power amplifier may be operated in its maximum gain mode and at its highest operating voltage Vcc. For example, when an output power of 24 dBm is required (in the FIG. 3 example), the power amplifier may be placed in its high gain mode and may be powered with a power supply voltage of V1 (point 100 on line H). When a lower output power is required, such as 20 dBm, it is no longer necessary to operate the power amplifier at V1. Rather, the power supply voltage for the power amplifier may be reduced to a Vcc value of V2 (point 102 on line H). This helps reduce power consumption. If an output power of 5 dBm is required, power consumption can be reduced further by placing the power amplifier in its low gain mode and reducing the power supply voltage to V3 (point 104).

As the example of FIG. 3 illustrates, both gain mode adjustments and power amplifier power supply voltage adjustments can be used in reducing power consumption for power amplifier 56. If desired, the potential inefficiencies of DC/DC converter 78 under certain operating conditions may be taken into account when making adjustments of this type. The efficiency of DC/DC converter 78 and other power regulator circuitry may be affected by the operating voltage Vcc and operating current Icc that DC/DC converter 78 produces at its output. At high output voltages Vcc and high output currents Icc, adjustable power supply circuitry such as DC/DC converters may operate at peak efficiency. At lower Vcc and Icc levels, efficiency tends to drop. It may therefore be most efficient to reduce power supply voltage Vcc only in situations in which the power amplifier power savings that are obtained by reducing Vcc are not offset by increases in power consumption in DC/DC converter 78. When Vcc is reduced, the values of power supply current and voltage that are used in powering power amplifier 56 tend to fall and overall power consumption will be reduced, so long as the reductions in power amplifier power consumption are not overwhelmed by power losses due to operating power supply circuitry 78 in an inefficient regime.

During operation of device 10, storage and processing circuitry 12 may control the power supply voltage from power supply 78 in accordance with the graph of FIG. 3. Dashed lines 106 and 108 indicate how it may be desirable to incorporate hysteresis into the control algorithm. Hysteresis in the curve of FIG. 3 may help transmitter circuitry in transceiver circuits 54 to satisfy phase discontinuity specifications.

The performance of wireless circuitry 18 in device 10 such as wireless circuitry 44 of FIG. 2 varies as a function of operating frequency. As a result, circuitry 44 will exhibit more "headroom" at some operating frequencies than others. The additional margin that exists at particular operating frequencies represents a potential for additional power savings. The highest levels of amplifier performance typically require correspondingly large power supply voltages. As a result, if there is not much performance margin at a particular operating frequency, it can be difficult or impossible to reduce the power supply voltage for the power amplifier to conserve power. On the other hand, at frequencies at which there is sufficient operating margin, power consumption by the power amplifier circuitry can be minimized by reducing the power supply voltage as described in connection with FIG. 3.

An important performance characteristic in many wireless systems is so-called adjacent channel leakage ratio (ACLR). ACLR values are a measure of how well adjacent channels are isolated from each other. When adjacent channels are well isolated from each other, ACLR values will be low (e.g., less than −33 dBc or even lower). When signals from one channel spill over into an adjacent channel, ACLR will be high (e.g., more than −33 dBc).

Figure 4:
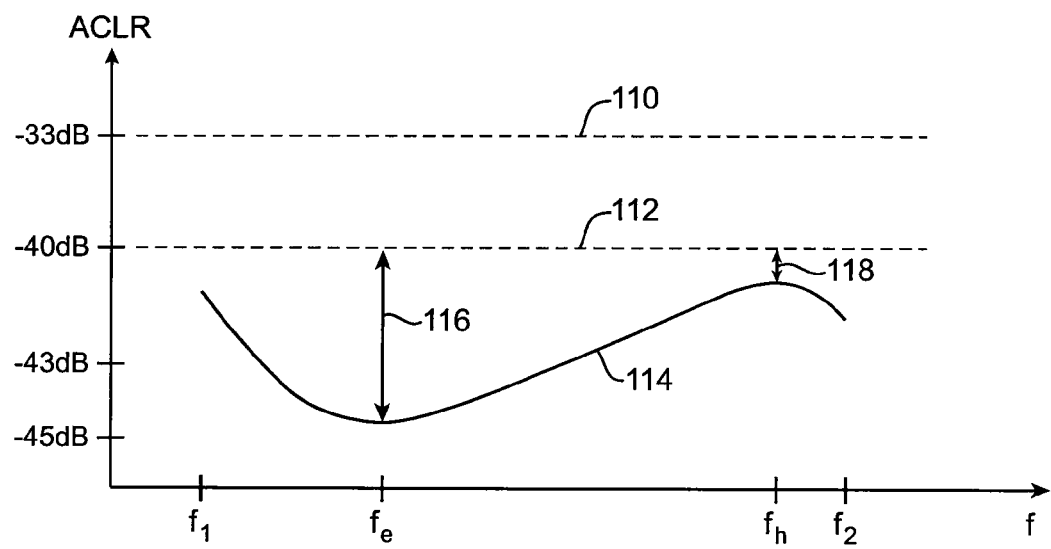
FIG. 4 is a graph showing how adjacent channel leakage ratio characteristics may vary as a function of transmitter frequency in electronic devices using wireless communications circuitry in accordance with an embodiment of the present invention.

A graph showing how ACLR may vary as a function of frequency in a given communications band is shown in FIG. 4. In the example of FIG. 4, device 10 is transmitting signals in a series of communications channels in a communications band that extends from lower frequency f1 to higher frequency f2. This range of frequencies may be associated with any suitable communications band (e.g., the transmission frequencies associated with a 1900 MHz band, as an example). In FIG. 4, ACLR values are plotted as a function of device operating frequency f. Dashed line 110 indicates a typical carrier-imposed ACLR requirement of −33 dBc. When operating wireless devices in the network of a carrier that imposes a −33 dBc ACLR requirement, all portions of ACLR curve 114 must be less than −33 dBc (i.e., curve 114 must lie under dashed line 110 in the graph of FIG. 4). Other carriers may impose more stringent or more lenient specifications. Moreover, a device manufacturer may decide to impose different standards. As an example, a device manufacturer may institute a self-imposed ACLR specification of −40 dBc, as illustrated by dashed line 112. The device manufacturer may impose a more stringent ACLR specification than the carrier to ensure that users of devices such as device 10 will be provided with high quality signals and to allow for manufacturing variations in device 10.

As the example of FIG. 4 demonstrates, some frequencies, such as frequency fe are associated with particularly good adjacent channel leakage ratios, whereas other frequencies, such as frequency fh are associated with relatively poorer adjacent channel leakage ratios. As indicated by lines 116 and 118, there is more operating margin at frequency fe than at frequency fh. Because of the additional overhead available at frequency fe, it is possible to reduce the power supply voltage Vcc for power amplifier circuitry 56 when device 10 is transmitting a radio-frequency signal in the channel at frequency fe. There is less overhead available at frequency fh, so little or no reduction to Vcc at fh may be made. By operating power amplifier circuitry 56 at a relatively high value of Vcc at frequency fh, the linearity of power amplifier circuitry 56 may be maximized, thereby helping device 10 produce its best possible ACLR value at fh. The reduced value of Vcc that is used at frequency fe may somewhat reduce the linearity of power supply circuitry 56 at frequency fe, causing power supply circuitry 56 to exhibit more adjacent channel leakage. This, in turn, will cause the ACLR value at frequency fe to increase, using up the operating margin 116. Using margin 116 in this way allows the Vcc value at frequency fe to be reduced, thereby conserving power.

If desired, the output power from transceiver circuitry 54 (Pin) may be adjusted to compensate for frequency-dependent fluctuations in output power. Storage and processing circuitry 12 may make these adjustments by supplying control signals to control path 88 (FIG. 2).

Figure 5:
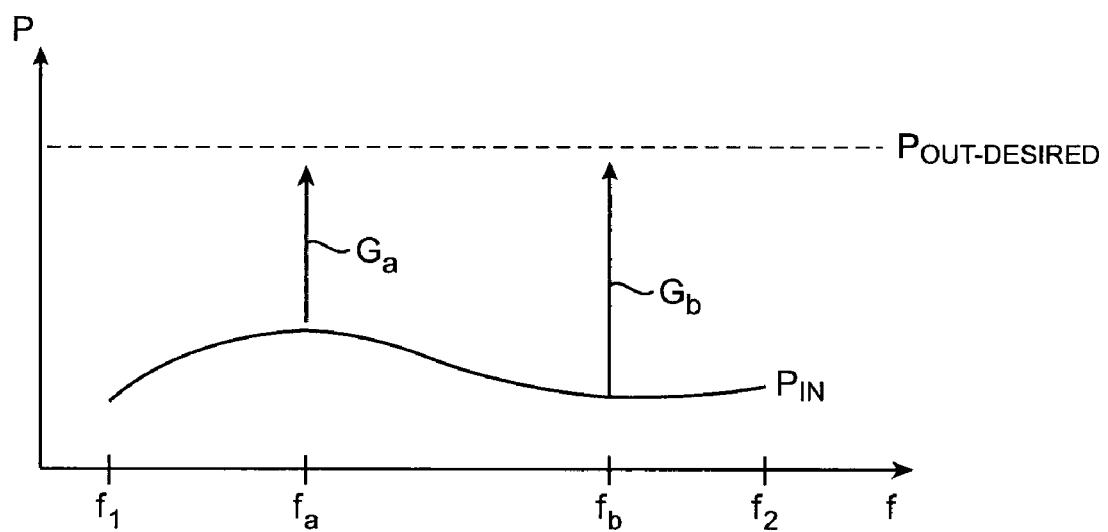
FIG. 5 is a graph showing how the amount of input power that is required to produce a desired output power with a radio-frequency transmitter power amplifier in an electronic device may vary as a function of frequency in accordance with an embodiment of the present invention.

A graph showing how Pin may be adjusted as a function of frequency to ensure that a particular constant output voltage Pout-desired is produced at the output of power amplifiers 56 (and antennas 62) is shown in FIG. 5. As the graph of FIG. 5 demonstrates, a given communications band (ranging from frequency f1 to frequency f2) may have some frequencies such as frequency fa in which power amplifier circuitry 56 is characterized by a relatively low gain Ga, so that a relatively large Pin value is needed at the output of transceiver circuits 54. At other frequencies in the same band, such as frequency fb, power amplifier circuitry 56 is characterized by a relatively higher gain Gb, so that a relatively small Pin value can be supplied at the output of transceiver circuits 54. In both situations, the combination of Pin and amplifier gain result in the same output power level (Pout-desired).

Figure 6:
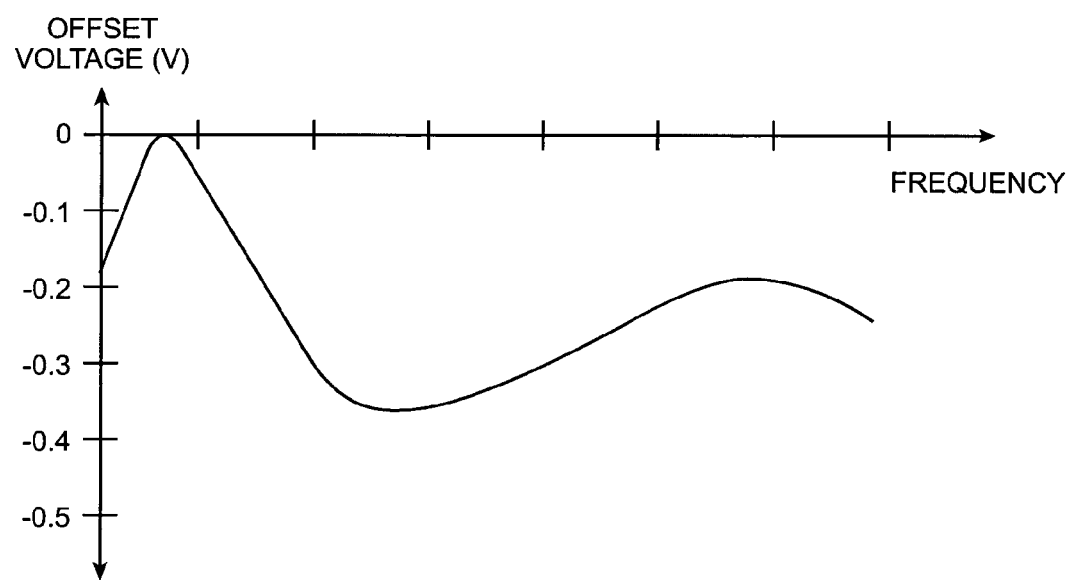
FIG. 6 is a graph of an illustrative radio-frequency power amplifier power supply voltage offset curve that may be used in operating an electronic device in accordance with an embodiment of the present invention.

The reductions in operating voltage Vcc that can be made selectively as a function of frequency to take advantage of excess ACLR overhead may be stored in a given device 10 in the form of frequency-dependent power supply voltage offset data. A typical power supply voltage offset curve is shown in FIG. 6. As shown in the FIG. 6 example, there may be particular frequencies at which it is possible to reduce the power supply voltage Vcc considerably and there may be particular frequencies at which little or no reduction to Vcc for power amplifier circuitry 56 is possible while still meeting required performance criteria such as required ACLR values. Because the magnitude of the Vcc reductions that are possible while meeting ACLR specifications depend upon frequency, the Vcc reductions form an offset curve or table. This offset data may be stored in memory in device 10 (e.g., storage and processing circuitry 12), so that device 10 can make appropriate Vcc adjustments during normal operation.

Characterizing measurements may be made to device 10 in any suitable environment. With one suitable arrangement, some characterizing measurements are made during laboratory testing. These characterizing measurements may then be stored in all devices 10 that are manufactured. Additional characterizing measurements may, if desired, be made during manufacturing (e.g., as part of a testing and calibration process in a factory). Other characterizing and calibration operations may also be performed if desired.

Figure 7:
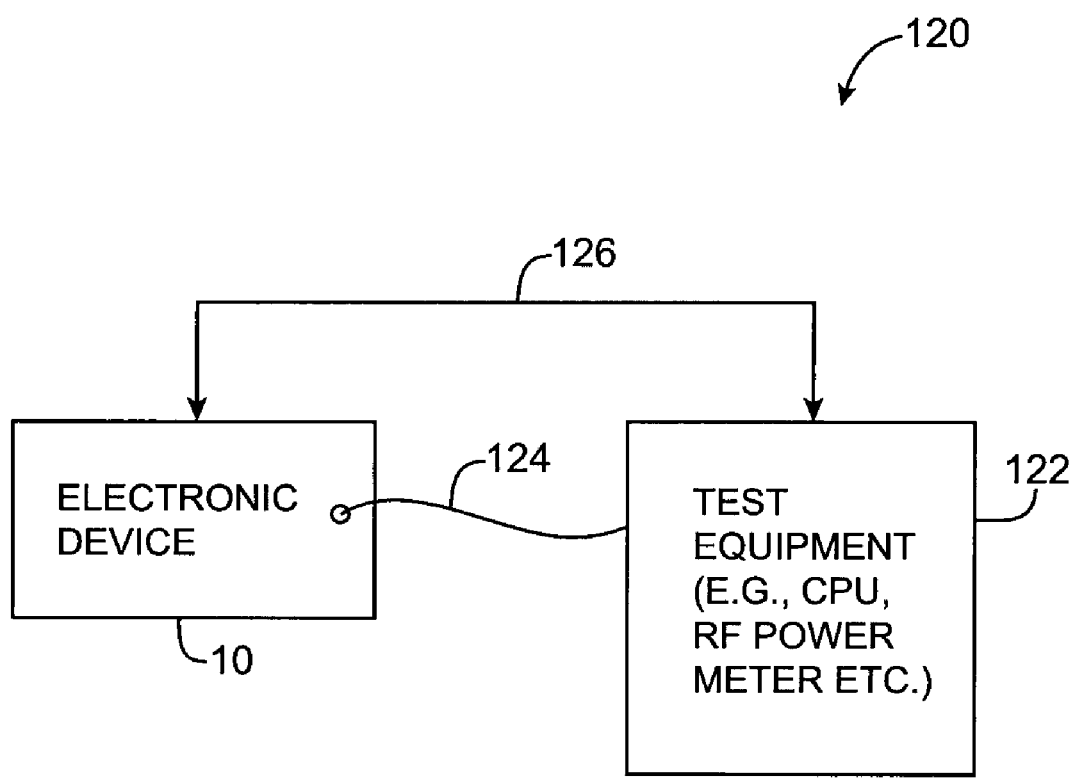
FIG. 7 is a diagram of illustrative characterizing equipment that may be used in measuring radio-frequency performance for electronic devices in accordance with embodiments of the present invention.

Radio-frequency calibration may be performed using any suitable test and measurement equipment. Illustrative equipment that may be used is shown in FIG. 7. As shown in FIG. 7, electronic device 10 may be characterized using systems such as system 120 that contain test equipment 122. Equipment 122 may include radio-frequency measurement equipment such as spectrum analyzer equipment, power meter equipment, etc. Equipment 122 may be connected to an antenna connector in device 10 using a radio-frequency transmission line path such as path 124. The radio-frequency connector in device 10 may, for example, be located between antennas 62 and the output of power amplifier circuitry 56. Transmission line 124 may be, for example, a coaxial cable. Paths such as path 126 may be formed between device 10 and external equipment. Following testing, test equipment 122 or other suitable equipment may use paths such as path 126 to load calibration information into device 10. Calibration data may be provided in the form of register settings, firmware, a portion of an operating system, device drivers, or any other suitable data. If desired, some of the calibration settings may be provided using one technique (e.g., as part of the initial software loaded onto device 10), whereas additional calibration settings may be provided to device 10 using another technique (e.g., by loading corrective data following test measurements that are made as part of a manufacturing process).

Figure 8:
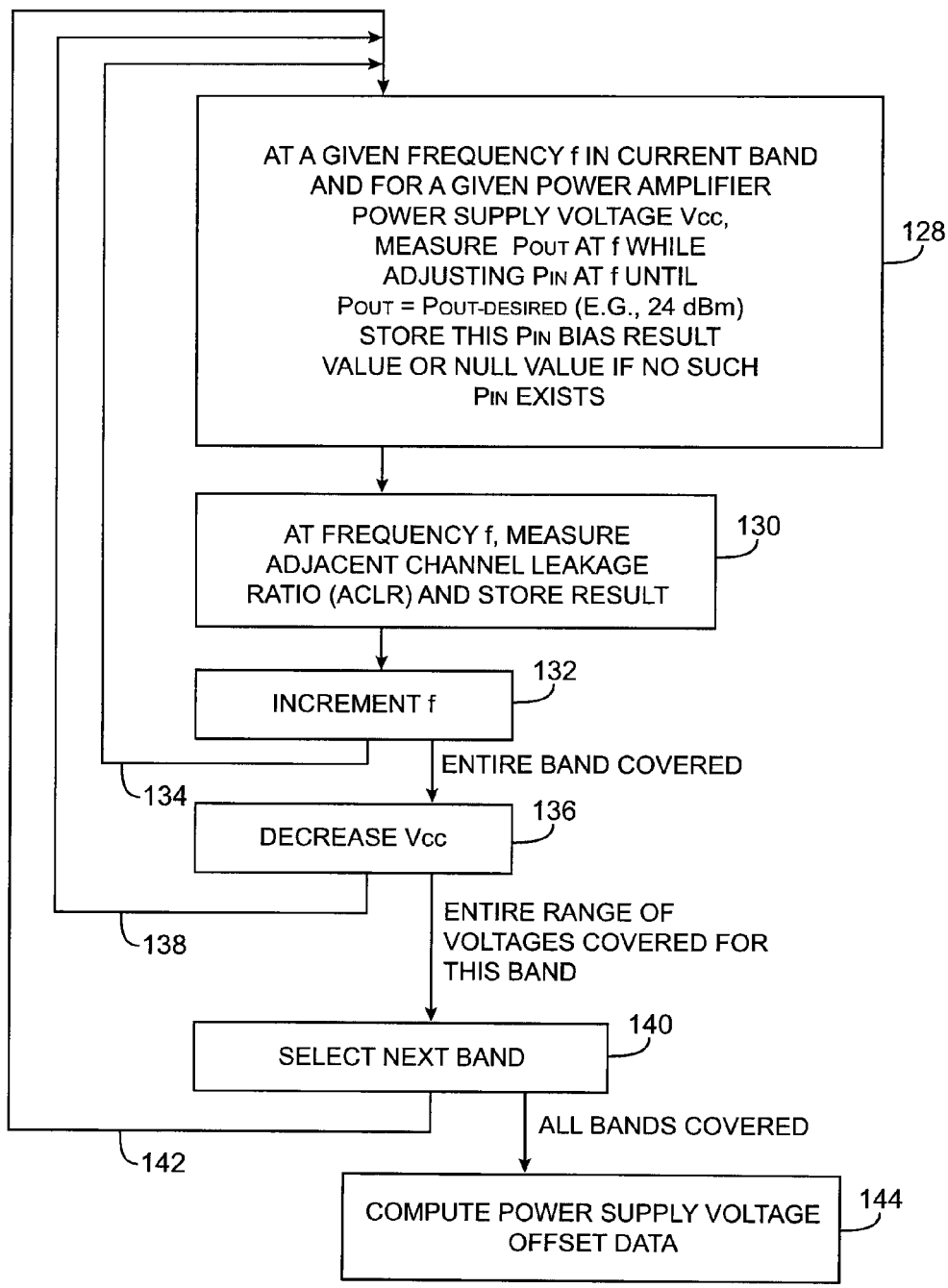
FIG. 8 is a flow chart of illustrative steps involved in obtaining power supply voltage offset data for use in operating a radio-frequency power amplifier in wireless communications circuitry for a portable electronic device in accordance with an embodiment of the present invention.

A flow chart of illustrative steps that may be made to gather power supply voltage offset data such as the data represented by the voltage offset curve of FIG. 6 are shown in FIG. 8. Operations of the type shown in FIG. 8 may be performed at any suitable time. For example, the characterizing measurements of the flow chart in FIG. 8 may be made as part of an initial calibration operation when one or more representative devices 10 are first characterized in a laboratory. Measurements of the type shown in FIG. 8 may also be performed in a manufacturing environment, if desired.

At step 128, in a measurement system such as system 120 of FIG. 7, the output power Pout from power amplifier circuitry 56 may be measured at a given frequency f. The output power Pout may be measured using test equipment 122, which is coupled to device 10 using transmission line 124. The measurement at step 128 may be made at a particular power supply voltage Vcc on path 86 and may be made with particular gain stages 70 in power amplifier circuitry 56 enabled. A variety of different Pin values may be used in making the power output measurement of step 128 so as to identify a Pin value at which Pout is equal to Pout-desired (FIG. 5). Data on the current settings of wireless circuitry 44 are then retained. For example, equipment 122 can populate a database table or other data structure with information related to the setting of transceiver circuitry 54 (i.e., the Pin value produced on path 55), the setting of power amplifiers 56 (i.e., which stages are enabled), the power supply voltage Vcc that is produced by supply circuitry 78, and the resulting Pout value measured by equipment 122 over path 124.

At step 130, at the same frequency f, equipment 122 may be used to make performance characterizing measurements such as measurements of the device's adjacent channel leakage ratio. Performance measurements (e.g., the measured ACLR value for frequency f, power supply voltage Vcc, and input power Pin) may be stored as part of the measurements results data gathered by test equipment 122.

At step 132, a new frequency in the current band may be selected at which to perform measurements. As shown by line 134, processing may then loop back to step 128. After all frequencies f in the current communications band have been measured at a given value of power amplifier power supply voltage Vcc, a new Vcc value may be selected (step 136). Processing may then again loop back to step 128, as indicated by line 138.

The operations of loops 134 and 138 allow test equipment 122 to determine the minimum power supply voltage Vcc that may be used to power the power amplifier circuitry 56 at each frequency f while producing a required output power (Pout-desired). If, as an example, the value of Pout-desired is 24 dBm, the operations of loops 134 and 138 allow identification of those Pin values and Vcc values that will produce a Pout value of 24 dBm at each frequency f. If, at a given voltage Vcc, it is not possible to produce Pout-desired, even at the largest available Pin settings, test equipment 122 may store data indicating the minimum Vcc value that is required to successfully produce Pout-desired.

After all voltages Vcc of interest have been covered for the current communications band and corresponding data has been gathered and stored by equipment 122, processing may proceed to step 140. During step 140, test equipment 122 may select an additional communications band of interest. For example, if the 850 MHz band has been covered, processing may proceed to the 900 MHz band. If the 850 MHz and 900 MHz bands have been covered, processing may proceed to the 1800 MHz band, etc. After selecting the next band of interest, processing may loop back to step 128, as indicated by line 142.

After all communications bands for device 10 have been covered, a power supply voltage offset characteristic such as the data of FIG. 6 may be computed (step 144). During step 144, test equipment 122 or other suitable computing equipment may analyze the data that has been gathered by test equipment 122 (i.e., the data that has been gathered and stored during steps 128 and 130). This data includes information identifying the minimum possible power amplifier supply voltage level (Vcc) that may be used at each frequency to successfully produce Pout-desired, while satisfying performance criteria such as the required ACLR values.

The analysis of step 144 may determine that at a particular frequency (e.g., frequency fe of FIG. 4), there is sufficient ACLR operating margin to reduce Vcc substantially. The minimum Vcc value that may be used to produce Pout-desired at this frequency may be less than a nominal operating voltage (e.g., 3.4 volts). Accordingly, the difference between the nominal operating voltage for powering power amplifier circuitry 56 and the minimum Vcc value (e.g., −0.5 volts) will represent the offset voltage value at frequency fe (in this example). At other frequencies, such as at frequency fh of FIG. 4, the analysis of step 144 may determine that Vcc cannot be reduced below its nominal operating voltage (e.g., 3.4 volts) while still satisfying Pout-desired and ACLR requirements. In this situation, the offset voltage will be zero (e.g., the offset voltage at frequency fh will be 0 volts). Other frequencies will have intermediate Vcc offset values.

The Vcc offset data that is produced at step 144 represents information on the magnitude of the power supply voltage reductions that may be made for each frequency of operation in device 10 to minimize power consumption, while still satisfying minimum output power and ACLR performance constraints. This information may be supplied to devices 10 using any suitable arrangement. For example, voltage offset settings may be stored in devices 10 when devices 10 are initially loaded with software during manufacturing, as part of a software update, using hardware settings, or using any other suitable arrangement. If desired, the same voltage offset data may be stored in each of the devices 10 that is manufactured. In this type of scenario, the voltage offset data represents global power supply voltage reduction settings for power supply 78. Power supply voltage versus required output power characteristics such as the data of FIG. 3 may also be stored in each device for use in controlling power supply 78.

Global settings such as these are not specific to a particular device 10. During manufacturing, it may be desirable to calibrate each device 10 individually. The same test equipment may be used in performing global characterizing measurements and in performing individual characterizing measurements or separate test systems may be used. For example, global characterizing measurements that are used in ascertaining suitable voltage versus output power curves of the type shown in FIG. 3 and that are used in producing power supply voltage versus frequency data of the type described in connection with the voltage offset curve of FIG. 6 may be produced with one characterization system (e.g., in a design environment) and additional calibration measurements may be made during manufacturing using another characterization system (e.g., in a manufacturing environment). The same system may also be used for all characterizing measurements if desired.

Figure 9:
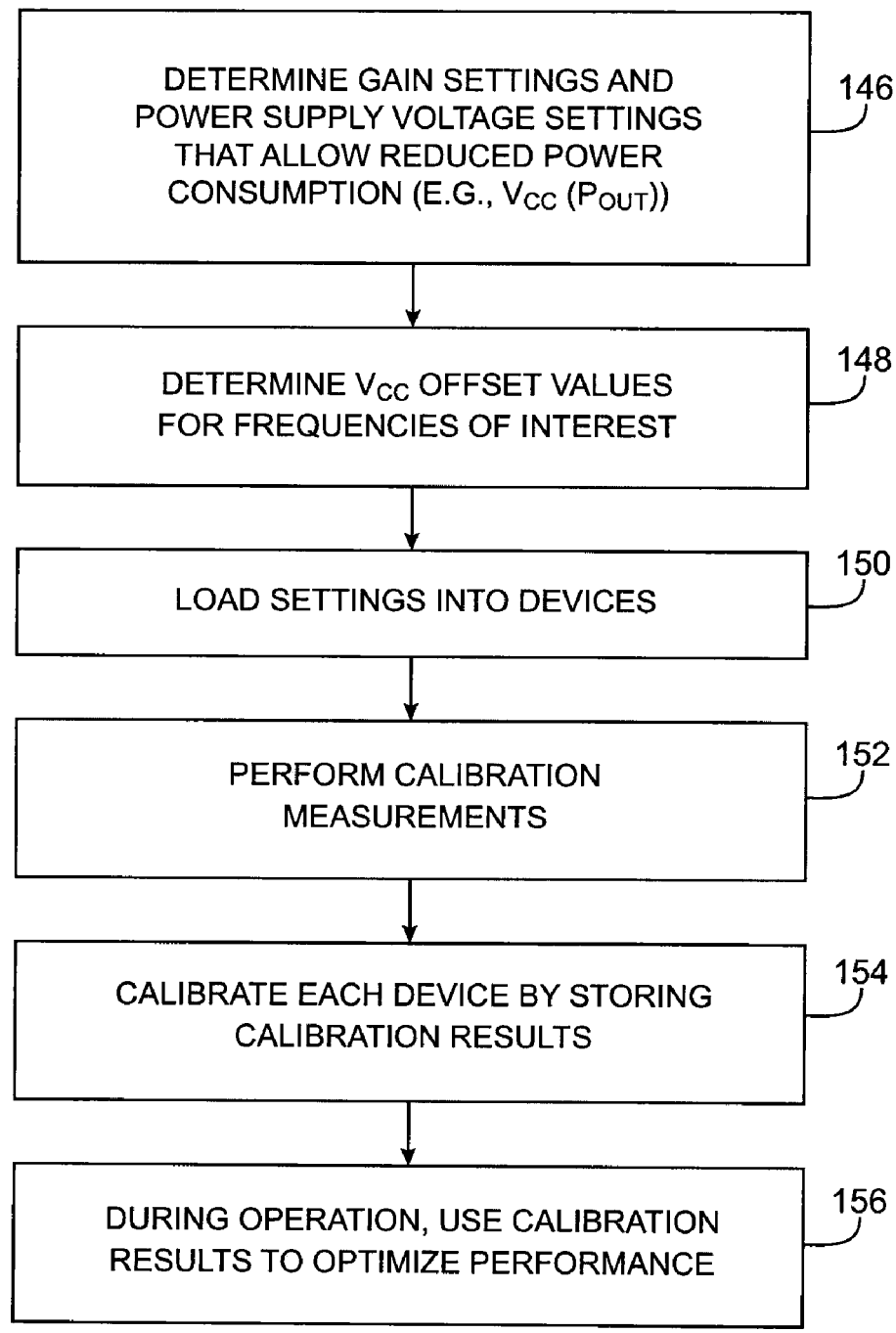
FIG. 9 is a flow chart of illustrative steps involved in calibrating and using a portable electronic device with power management capabilities in accordance with an embodiment of the present invention.

Illustrative steps involved in performing global and individual device calibration operations are shown in FIG. 9.

At step 146, test equipment may be used to determine global gain settings and power supply voltage settings that may be used to allow devices 10 to reduce power consumption at various required output power levels. For example, at high output power levels such as when operating a device at a 24 dBm output power (point 100 of FIG. 3), a voltage of V1 may be used in powering radio-frequency power amplifier circuitry and power amplifier circuitry 56 may be operated in a "high" gain mode in which all of its gain stages 70 are enabled. At lower output power levels, power supply voltage Vcc and/or the number of gain stages that are enabled in power amplifier circuitry 56 may be scaled back, as described in connection with FIG. 3.

The power supply voltage versus output power characteristic of FIG. 3 is the same for all operating frequencies. At step 148, the frequency dependence of wireless circuitry 44 may be characterized by performing measurements and calculations of the types described in connection with FIG. 8. In particular, during step 148, additional (offset) changes that may be made to the power supply voltage Vcc may be ascertained for each desired operating frequency.

The global characterizing data obtained during steps 146 and 148 may be loaded into devices 10 during manufacturing or at other suitable times (step 150).

At step 152, individual characterizing measurements may be made. As these characterizing measurements are being made, each device 10 may use its storage and processing circuitry 12 to implement a control algorithm based on the Vcc and gain versus output power characteristic of FIG. 3 and the Vcc versus frequency characteristics of FIG. 6 (with appropriate scaling for different output powers). The calibration measurements of step 152 may be used to produce a family of curves, each of which corresponds to a different output power value. For example, Pout-desired may be decreased in 1 dB steps from 24 dBm to −50 dBm. For each respective Pout-desired setting, the operating frequency f may be swept while the required Pin value for producing the current Pout-desired value may be measured. The characterizing operations of step 152 may therefore serve to produce a family of Pin versus frequency curves for a variety of discrete Pout settings. If desired, characterizing operations may be performed in which calibration data is gathered and represented in different formats (e.g., semi-continuously, using steps of different sizes, performing sweeps of different variables, etc.).

The device-specific calibration information that is gathered during step 152 may be stored in the corresponding device 10 at step 154. For example, a path such as data path 126 of FIG. 7 or other suitable communications path may be used to store information in storage in device 10 on which Pin values should be produced by transceiver circuitry 54 for each frequency. During operation, this information may be used by device 10 in conjunction with previously-stored information in device 10 on the particular Vcc setting and gain setting from the previously-stored calibration results to select appropriate operating parameters for circuitry 44.

After performing the device-specific calibration operations of step 154, device 10 may be shipped to a user and used to communicate. For example, a user may use device 10 to make cellular telephone calls and to send and receive cellular telephone non-voice data (step 156). During operation, device 10 can use the calibration settings that were obtained at steps 146, 148, and 152. In particular, device 10 can select which power supply voltage Vcc to use and which gain stages in amplifier circuitry 56 are to be turned on by selecting an appropriate operating point on curves of the type shown in FIG. 3 based on required output power. Power supply voltage versus frequency characteristics may also be used in controlling the operation of wireless circuitry 44, as described in connection with FIG. 6.

If desired, the offset-voltage versus frequency characteristics used by device 10 may be scaled back at lower output powers to avoid over-adjusting Vcc as a function of frequency at lower Pout settings. For example, the offset voltage versus frequency characteristic of device 10 may be fully used at high powers (e.g., at output powers of 24 dBm), but may be phased out gradually at lower powers. This phase out process may be implemented progressively, so that when a particular low output power value is reached (e.g., 16 dBm), the voltage offset versus frequency characteristic is completely phased out and has no further impact (e.g., there is no frequency component to the Vcc adjustments that are made at output powers below 16 dBm).

The foregoing is merely illustrative of the principles of this invention and various modifications can be made by those skilled in the art without departing from the scope and spirit of the invention.

What is claimed is:

1. Circuitry on a portable electronic device, comprising:
a radio-frequency power amplifier that amplifies radio-frequency signals at a given operating frequency that are wirelessly transmitted from the portable electronic device;
adjustable power supply circuitry that supplies an adjustable power supply voltage to the radio-frequency power amplifier; and
storage and processing circuitry that adjusts the adjustable power supply voltage supplied by the adjustable power supply circuitry to the radio-frequency power amplifier based at least partly on the given operating frequency, wherein the amplified radio-frequency signals are output from the radio-frequency power amplifier at an output power in a communications band subject to adjacent channel leakage ratio requirements and wherein the storage and processing circuitry is configured to store calibration data specifying adjustments that are made to the adjustable power supply voltage as a function of the given operating frequency to minimize the adjustable power supply voltage to conserve power while ensuring that the adjustable power supply voltage has a value equal to or greater than a value such that the amplified radio-frequency signals satisfy the adjacent channel leakage requirements.

2. The circuitry defined in claim 1 wherein the storage and processing circuitry is configured to store calibration data specifying adjustments that are made to the adjustable power supply voltage using the adjustable power supply circuitry as a function of the given operating frequency and as a function of the output power.

3. The circuitry defined in claim 2 further comprising transceiver circuitry that supplies the radio-frequency signals to an input of the radio-frequency power amplifier at a given input power, wherein the storage and processing circuitry is configured to store calibration data specifying how the given input power is adjusted by the transceiver circuitry as a function of the given operating frequency.

4. The circuitry defined in claim 3 wherein the radio-frequency power amplifier has an associated gain provided by multiple gain stages and wherein the storage and processing circuitry is configured to store calibration data specifying how the gain is adjusted by selectively enabling the gain stages as a function of desired values of the output power.

5. The circuitry defined in claim 2 wherein the radio-frequency power amplifier has an associated gain provided by multiple gain stages and wherein the storage and processing circuitry is configured to store calibration data specifying how the gain is adjusted by selectively enabling the gain stages as a function of desired values of the output power.

6. The circuitry defined in claim 1 further comprising transceiver circuitry that supplies the radio-frequency signals to an input of the radio-frequency power amplifier at a given input power, wherein the storage and processing circuitry is configured to store calibration data specifying how the given input power is to be adjusted by the transceiver circuitry as a function of the given operating frequency.

7. A method for operating a wireless electronic device having at least one antenna, a radio-frequency power amplifier, and an adjustable power supply that supplies the radio-frequency power amplifier with an adjustable power supply voltage, wherein the amplified radio-frequency signals are output from the radio-frequency power amplifier at an output power in a communications band subject to adjacent channel leakage ratio requirements, the method comprising:
with the radio-frequency power amplifier, amplifying radio-frequency signals at a given frequency to be transmitted through the antenna; and
with the adjustable power supply, providing an adjustable power supply voltage to the radio-frequency power amplifier that varies as a function of the given frequency to minimize the adjustable power supply voltage to conserve power while ensuring that the adjustable power supply voltage has a value equal to or greater than a value such that the amplified radio-frequency signals satisfy the adjacent channel leakage requirements; and
with storage and processing circuitry, storing calibration data specifying adjustments that are made to the adjustable power supply voltage as a function of the given frequency to minimize the adjustable power supply voltage to conserve power while ensuring that the adjustable power supply voltage has a value equal to or greater than a value such that the amplified radio-frequency signals satisfy the adjacent channel leakage requirements.

8. The method defined in claim 7 wherein the wireless electronic device further comprises transceiver circuitry that supplies the radio-frequency power amplifier with the radio-frequency signals at a given input power, the method further comprising:
adjusting the given input power with the transceiver circuitry based on frequency-dependent calibration data.

9. The method defined in claim 7 wherein the radio-frequency power amplifier has a gain level established by gain stages in the radio-frequency power amplifier, the method further comprises:

selectively enabling the gain stages to adjust the gain level based at least partly on a desired output power for the amplified radio-frequency signals.

10. The method defined in claim 7 further comprising:
with the adjustable power supply, providing the adjustable power supply voltage to the radio-frequency power amplifier based at least partly on a desired output power for the amplified radio-frequency signals.

11. The method defined in claim 10 wherein the wireless electronic device further comprises transceiver circuitry that supplies the radio-frequency power amplifier with the radio-frequency signals at a given input power, the method further comprising:
adjusting the given input power with the transceiver circuitry based on frequency-dependent calibration data.

12. The method defined in claim 10 wherein the radio-frequency power amplifier has a gain level established by gain stages in the radio-frequency power amplifier, the method further comprises:
selectively enabling the gain stages to adjust the gain level based at least partly on the desired output power for the amplified radio-frequency signals.

13. A portable electronic device, comprising:
an antenna;
a radio-frequency power amplifier that amplifies radio-frequency signals at a given operating frequency that are transmitted from the portable electronic device through the antenna;
adjustable power supply circuitry that supplies an adjustable power supply voltage to the radio-frequency power amplifier; and
storage and processing circuitry that adjusts the adjustable power supply voltage supplied by the adjustable power supply circuitry to the radio-frequency power amplifier as a function of the given operating frequency, wherein the amplified radio-frequency signals are output from the radio-frequency power amplifier at an output power in a communications band subject to adjacent channel leakage ratio requirements and wherein the storage and processing circuitry is configured to store calibration data specifying adjustments that are made to the adjustable power supply voltage as a function of the given operating frequency to minimize the adjustable power supply voltage to conserve power while ensuring that the adjustable power supply voltage has a value equal to or greater than a value such that the amplified radio-frequency signals satisfy the adjacent channel leakage requirements.

14. The portable electronic device defined in claim 13 wherein the storage and processing circuitry is configured to store calibration data specifying adjustments that are made to the adjustable power supply voltage as a function of the given operating frequency and as a function of the output power.

15. The portable electronic device defined in claim 14 further comprising:
transceiver circuitry that supplies the radio-frequency signals to an input of the radio-frequency power amplifier at a given input power, wherein the storage and processing circuitry is configured to store calibration data specifying how the given input power is to be adjusted by the transceiver circuitry as a function of the given operating frequency to produce a desired output power from the radio-frequency power amplifier for all frequencies in a given communications band.

16. The portable electronic device defined in claim 13 further comprising:
transceiver circuitry that supplies the radio-frequency signals to an input of the radio-frequency power amplifier at a given input power, wherein the storage and processing circuitry is configured to store calibration data specifying how the given input power is to be adjusted by the transceiver circuitry as a function of the given operating frequency.

17. The portable electronic device defined in claim 16 wherein the storage and processing circuitry is configured to store calibration data specifying adjustments that are made to the adjustable power supply voltage as a function of the given operating frequency and as a function of the output power.

18. The portable electronic device defined in claim 13 further comprising transceiver circuitry that supplies the radio-frequency signals to an input of the radio-frequency power amplifier at a given input power, wherein the storage and processing circuitry is configured to:
store calibration data specifying how the given input power is to be adjusted by the transceiver circuitry as a function of the given operating frequency; and
store calibration data specifying gain mode adjustments and adjustments to the power supply voltage for the power amplifier to conserve power based on required output power levels from the power amplifier circuitry.

* * * * *